Sept. 6, 1955     W. BADER     2,716,800
TOOL HOLDER
Filed Feb. 25 1954
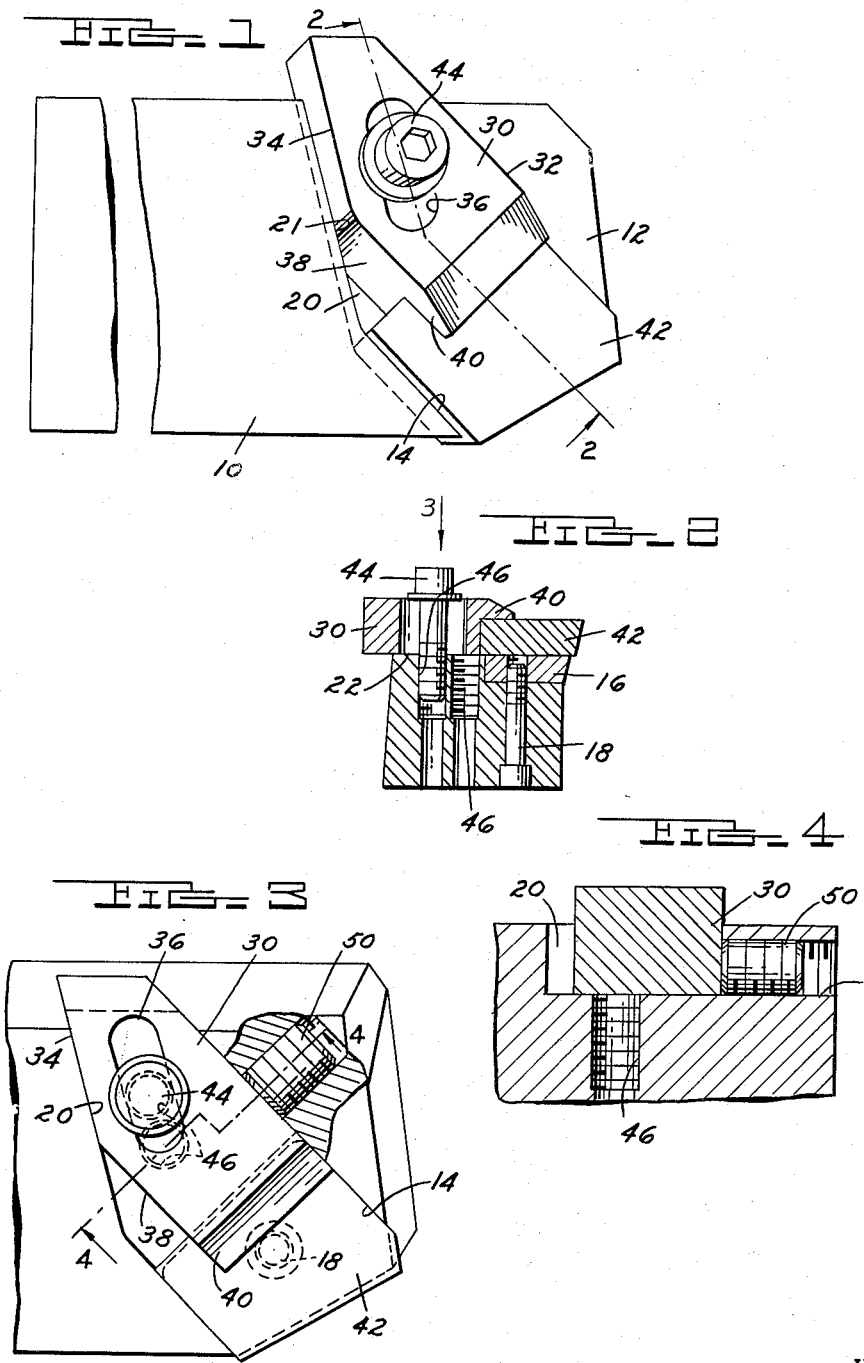
INVENTOR.
WILLIAM BADER
BY
Barnes, Kisselle, Laughlin & Raisch
ATTORNEYS

United States Patent Office 2,716,800
Patented Sept. 6, 1955

2,716,800
TOOL HOLDER

William Bader, Ferndale, Mich., assignor to Wesson Multicut Company, Ferndale, Mich., a corporation of Michigan Application February 25, 1954, Serial No. 412,488

4 Claims. (Cl. 29—96)

This invention relates to a tool holder and clamp and particularly to a construction for holding a carbide insert in a tool holder.

Numerous clamping methods have been used for carbide inserts, and the present construction contemplates a detailed improvement in a tool which is used for extremely heavy cuts, particularly a tool which can be used on planer machines and one which is also usable on other types of machines if desired.

Briefly, the invention consists of a body having a channel in one surface for receiving a carbide insert, said channel being extended to receive a backing member for the insert, which is also a clamping member therefor, thus insuring a positive support for the insert and making it possible to use up the insert to a very small dimension before substitution of a new one.

Other objects and features of the invention will be apparent in the following description and claims.

Drawings accompany the invention, and the various views thereof may be briefly described as:

Figure 1, a plan view of the assembled device.
Figure 2, a sectional view on line 2—2 of Figure 1.
Figure 3, a detailed plan view partially in section.
Figure 4, a sectional view on line 4—4 of Figure 3.

Referring to the drawings, the body 10 of the tool holder has a working end 12 which is provided with an angled recess 14 extending to one corner of the body. At the bottom of this recess is an anvil member 16 formed of high-speed tool steel or some other hard material held in place by a bolt 18. The recess 14 continues rearwardly in a triangular recess 20 having one edge aligned with the recess 14 and the other edge angled therefrom.

The base 22 of the recess 20 is on a level with the surface of the anvil member 16. In the recess 20 is a tool backing and clamping member 30 adapted to slide in the recess 20 on the base 22 and on the anvil 16. The insert 30 is provided with a straight side 32 and an angled side 34 which contacts the angled side of the recess 20. The insert is slotted at 36, the slot having an axis which is parallel with the side 34. Thus, the insert may slide in the recess 20 until the straight surface 38 contacts the rear wall of the recess 14 as viewed in Figure 1.

Projecting from the top of the insert 30 is a ledge portion 40 which overlies the top of a carbide insert 42 to clamp it in position. The clearance dimension of the lower surface of the overhang 40 is smaller than the thickness of the insert so that an Allen head bolt 44 in cooperation with a washer 46 will hold the insert 30 in place and clamp the carbide insert 42 in any position to which it is adjusted.

As shown in Figures 2 and 3, two holes are provided for the bolt 44, the second hole being shown at 46. Thus, the bolt can be shifted forwardly as the insert is moved forwardly to maintain the bolt in a forward position with respect to the slot 36. A locking screw 50 is provided in a side opening 52 to lock the insert 30 solidly in position once the adjustment is made.

It will be seen from the above that the carbide insert 42 can be shifted in its recess forwardly and re-ground frequently until it is completely used up. The clamp insert 30 moves forward with the insert to back it and clamp it in place in all positions. The construction has been found to be particularly useful for extremely heavy cuts and has reduced tool cost materially while increasing the life of the tool per piece cut to a great degree. It has been found possible successfully to cut up to ⅞ inch in depth with this tool holder.

It will be noted further that the holder plate 30 is laterally stabilized by surface 34, being at all times in contact with the angled surface 21 of the recess 20. At the other side the backing screw 50 is moved into contact with the vertical wall of the plate 30. When the top bolt 44 is tightened down, the plate 30 is tightly held against movement or vibration and the working thrust applied to the corner 42 is taken at the wall 21 on the plate 30 and at the wall of recess 14 which backs the insert 42.

I claim:

1. A tool holder comprising a body having walls formed thereon converging in the direction of one side of said holder, a recess formed in said body having parallel walls joining said first-named walls, a bit insert to lie in said recess, a clamp block movable along one of said converging walls having a portion to lie behind and a portion to overlie said insert, and means on the other of said converging walls movable transversely of said clamp toward said first converging wall to provide a wedge recess to limit the movement of said clamp block in a rearward direction.

2. A device is defined in claim 1 in which said means comprises a screw movable through one of said converging walls to contact a side of said block.

3. A device as defined in claim 1 in which said block is slotted on an axis parallel to one of said converging walls, and a holding bolt transfixing said block through said slot anchored in said body.

4. In a tool holder, a means forming an ensmallable wedge-shaped recess open in a diverging direction, a bit insert recess formed in said holder at the open end of said first recess, a tool bit insert in said last recess, and a back-up block in said first recess engaged on at least two surfaces with said bit insert to lock the insert against movement.

References Cited in the file of this patent
UNITED STATES PATENTS

| | | |
|---|---|---|
| 2,181,023 | Moore | Nov. 21, 1939 |
| 2,623,273 | Greenleaf | Dec. 30, 1952 |
| 2,659,963 | Severson | Nov. 24, 1953 |
| 2,675,604 | Plummer | Apr. 20, 1954 |